United States Patent [19]

Dombroski

[11] Patent Number: 5,497,151
[45] Date of Patent: Mar. 5, 1996

[54] COMPACT ONE-HANDED TYPING KEYBOARD HAVING KEYS CORRESPONDING TO A STANDARD TWO-HANDED KEYBOARD

[76] Inventor: Michael L. Dombroski, 321 N. Lincoln St., Bay City, Mich. 48708

[21] Appl. No.: 243,568

[22] Filed: May 16, 1994

Related U.S. Application Data

[62] Division of Ser. No. 782,064, Oct. 24, 1991, Pat. No. 5,329,278.

[51] Int. Cl.[6] .................................................. H03K 17/94
[52] U.S. Cl. .............................. 341/22; 341/20; 400/489
[58] Field of Search .......................... 341/20–23; 364/189, 364/709.12; 345/168, 169; 400/472, 486, 489

[56] References Cited

U.S. PATENT DOCUMENTS

| | | | |
|---|---|---|---|
| 3,691,324 | 9/1972 | Brantingson | 200/5 E |
| 3,847,263 | 11/1974 | X | 400/486 |
| 3,971,902 | 7/1976 | Wulf et al. | 200/5 A |
| 3,983,355 | 9/1976 | Hyodo | 200/511 |
| 4,265,557 | 5/1981 | Runge | 400/479 |
| 4,311,884 | 1/1982 | Henley et al. | 200/217 |
| 4,440,515 | 4/1984 | Nassimbene | 400/479 |
| 4,486,637 | 12/1984 | Chu | 200/517 |
| 4,843,200 | 6/1989 | Parlatore et al. | 200/553 |
| 4,849,732 | 7/1989 | Dolenc | 341/20 |
| 4,897,649 | 1/1990 | Stucki | 341/20 |
| 4,913,573 | 4/1990 | Retter | 345/168 |
| 4,918,264 | 4/1990 | Yamamoto et al. | 200/5 R |
| 5,003,301 | 3/1991 | Romberg | 345/168 |
| 5,053,591 | 10/1991 | Theurer | 200/315 |
| 5,087,910 | 2/1992 | Guyot-Sionnest | 345/169 |
| 5,288,158 | 2/1994 | Matias | 345/169 |
| 5,367,298 | 11/1994 | Axthelm | 341/22 |

OTHER PUBLICATIONS

PC Magazine, Dec. 12, 1989 pp. 240, 241.
The Matias Corp, brochure 4 p. unnumbered.
IBM Corp. Bulletin vol. 27 No. 10A Mar. 1985 pp. 5640, 5641 5642.
"Keyboard for Handheld Computer," IBM Technical Disclosure Bulletin, vol. 27, No. 10A, Mar. 1985, pp. 5643–5645.

*Primary Examiner*—Brent A. Swarthout
*Assistant Examiner*—Andrew Hill
*Attorney, Agent, or Firm*—Learman & McCulloch

[57] ABSTRACT

A compact keyboard has a plurality of pairs of individually movable side by side keys, each pair of which is on opposite sides of a vertical plane lying between such keys. All of the keys are operable by the fingers of one hand of a person and the keys of the compact keyboard correspond in number to the number of keys of a conventional QWERTY keyboard. The keys of the compact keyboard operable by the fingers of a person's left hand alternate with the keys operable by the person's right hand.

11 Claims, 2 Drawing Sheets

COMPACT ONE-HANDED TYPING KEYBOARD HAVING KEYS CORRESPONDING TO A STANDARD TWO-HANDED KEYBOARD

This application is a division of U.S. Ser. No. 07/782,064, filed Oct. 24, 1991, U.S. Pat. No. 5,329,278

TECHNICAL FIELD

The invention relates to an electronic keyboard having a plurality of independently operable keys operable by one hand of a person and more particularly to a one-handed keyboard having keys corresponding to the number of keys of a standard two-handed keyboard.

BACKGROUND OF THE INVENTION

Standard electronic keyboards for computers are operated by both hands. These keyboards are too large and cumbersome for use with miniaturized hand held computers and computer terminals. Small keyboards have been developed for use with hand held computers and computer terminals. Many of these keyboards are designed to be operated by the index finger of one hand. Operation by one finger is relatively slow. The large number of keys to be operated by one finger generally requires visual observation of the keyboard in order to direct the finger to the proper keys.

Keyboards designed to be operated by the thumb and four fingers of one hand have been designed to provide increased speed and to allow manipulation of the keys without visual reference to the keyboard. These keyboards are only marginally successful. It can be difficult to locate and press one key at a time. Rocker type switches, which have been used to assist the finger in locating the keys, move sideways as well as vertically. The movement to the side and the relatively short vertical movement provide poor tactile response to the fingers and slows operation.

SUMMARY OF THE INVENTION

A compact keyboard constructed in accordance with the invention has a first group of individually operable keys corresponding to those keys of a standard keyboard operable by the left hand of a person and a second group of individually operable keys corresponding to those keys of a standard keyboard operable by the right hand of such person. The two groups of keys of the compact keyboard are arranged in parallel, spaced apart columns and rows. The spacing between adjacent rows is uniform, but the spacing between adjacent columns of the first group of keys is sufficient to enable the keys of the second group of keys to alternate with the keys of the first group. In this arrangement one finger of a person's hand may operate any key of any two adjacent columns, the keys at the left side of the columns corresponding to the keys of a standard keyboard operable by a person's left hand and the keys at the right side of the columns corresponding to the keys of a standard keyboard operable by the person's right hand.

The features and advantages of the invention will become apparent in light of the following detailed description of an exemplary embodiment thereof, as illustrated in the accompanying drawings.

DETAILED DESCRIPTION OF THE INVENTION

Figure 1:
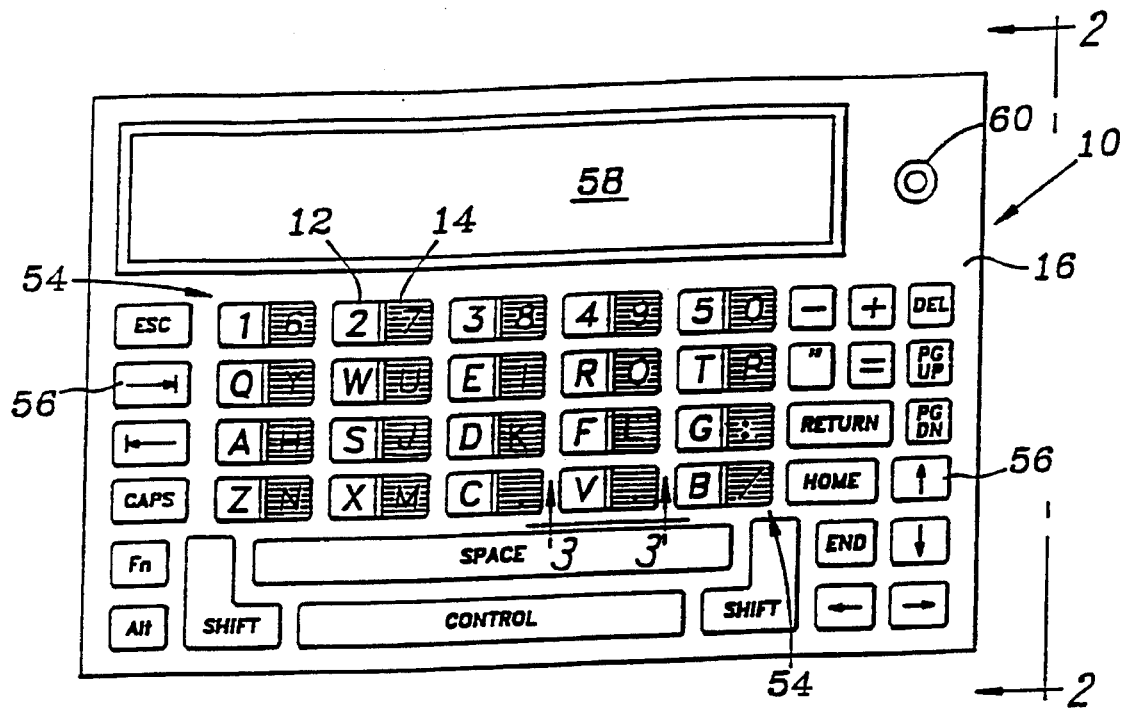
FIG. 1 is a full scale top view of a complete, compact keyboard incorporating twenty pairs of the side by side keys arranged in columns and rows.

A portion of a compact computer keyboard 10, with a plurality of first or left hand keys 12 and a plurality of second or right hand keys 14, is shown in FIG. 1. The first and second keys 12 and 14 of each pair are positioned side by side so that they can be bridged and operated by one finger with minimal lateral finger movement. The first and second keys are supported on a mounting frame including a face plate 16 having an opening through which the keys project.

Figure 2:
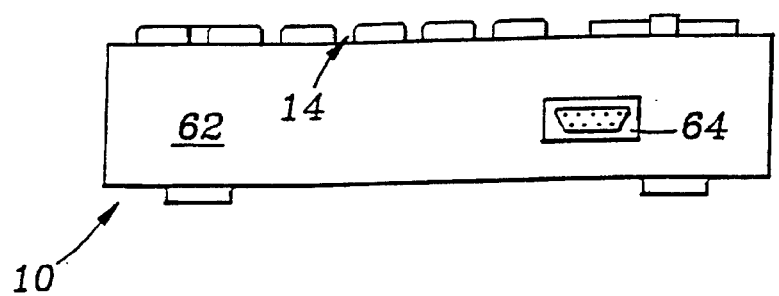
FIG. 2 is a side elevation of the complete keyboard taken along line 2—2 in FIG. 1.
Figure 3:
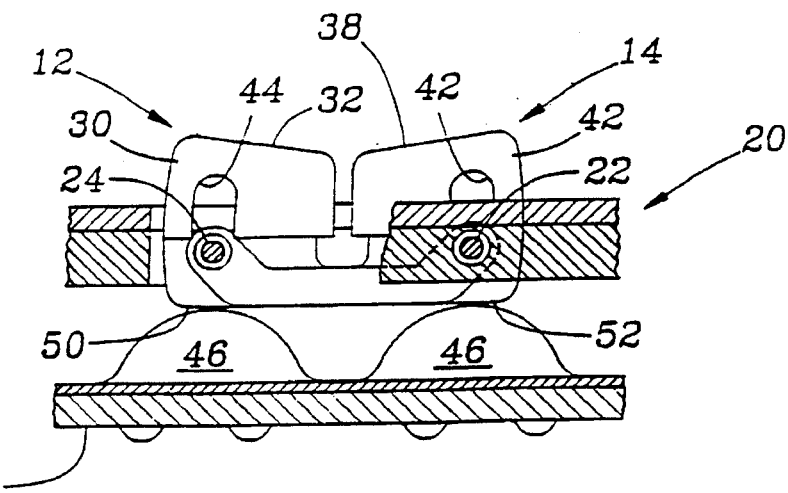
FIG. 3 is an enlarged end view of one pair of side by side keys with parts broken away taken along line 3—3 in FIG. 1.
Figure 4:
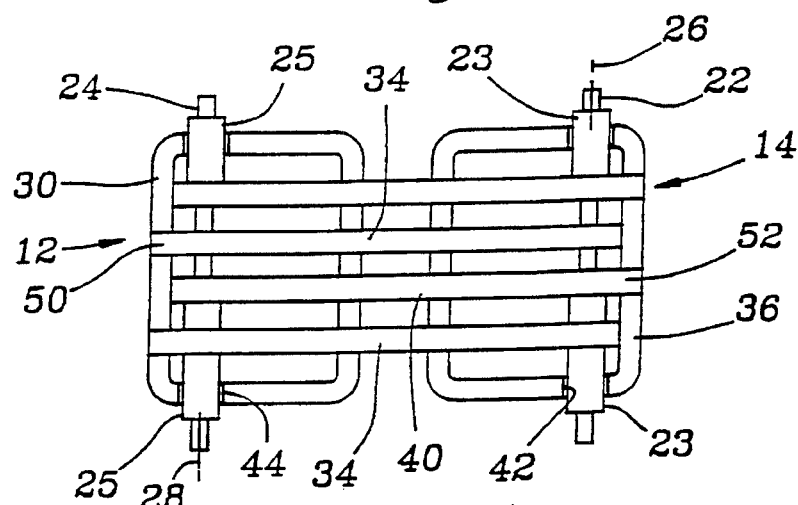
FIG. 4 is a bottom view of a pair of keys and pivot pins taken along line 4—4 in FIG. 3.

The face plate 16 is attached to a face board 18 (FIG. 3). The face plate 16 and the face board 18 together form a mounting plate 20, a portion of which is shown in FIG. 2. The face plate 16 and the face board 18 could be one part rather than multiple parts if desired. A first pivot pin 22 is mounted in a recess in the face board 18. A second pivot pin 24 is also mounted in a recess in the face board 18. The first and second pivot pins 22 and 24 have parallel spaced apart axes 26 and 28 (FIG. 4). Both the first and the second pivot pins 22 and 24 are positioned adjacent to the face plate 16 to position the first and second pivot pin axes 26 and 28 as high as possible.

Each first key 12 includes a body portion 30 and a key face surface 32 (FIG. 3). The body portion 30 is pivotally attached to the first pivot pin 22 by arm members 34 (FIG. 4) which extend laterally to one side of the key face surface 32. Each second key 14 includes a body portion 36 and a key face surface 38. The body portion 36 is pivotally attached to the second pivot pin 24 by arm members 40 which extend laterally to one side of the key face surface 38. The arm members 34 are integral parts of the body portion 30 and extend under the key face surface 38 of the companion second key 14. The arm members 40 are integral parts of the body portion 36 and extend under the key face surface 32 of the companion first key 12. The arm members are maintained in position on the respective pins 22 and 24 by spacers 23 and 25 (FIG. 4).

Figure 5:
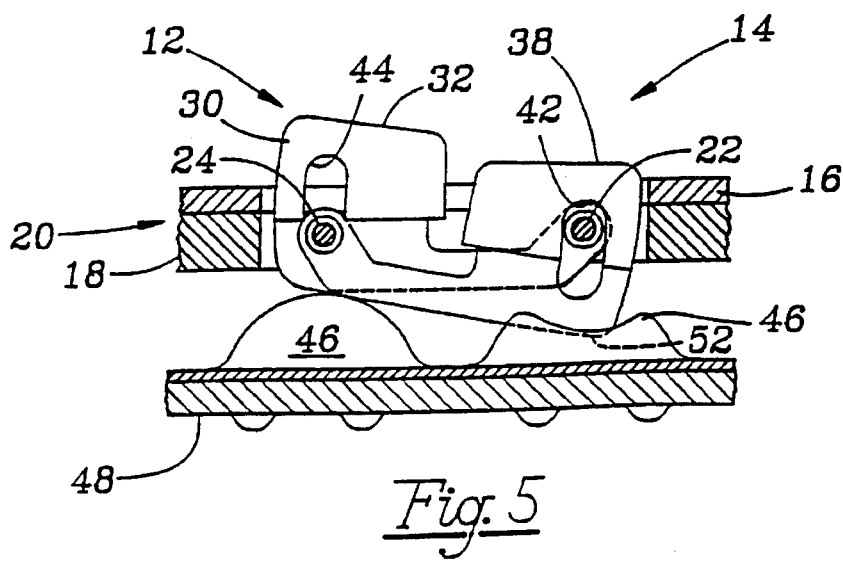
FIG. 5 is an end view similar to FIG. 2 with one key depressed.

The first pivot pin 22 passes through an aperture 42 in the second key 14 as shown in FIGS. 3 and 5 of the drawing. The second pivot pin 24 passes through an aperture 44 in the first key 12. The first and second pivot pins 22 and 24 in this location cooperate with the apertures 42 and 44 to act as stops and limit movement of the first and second keys 12 and 14 about the axes 26 and 28.

It is not essential, of course, that the pins 22 and 24 extend through all of the respective keys. Each key may be mounted for rotation about an individual axis, if desired, by any conventional, suitable pivot means.

The axes 26 and 28 of the first and second pivot pins 22 and 24 are spaced apart and located on opposite sides of a vertical plane P (FIG. 3) lying between the adjacent pair of keys 12 and 14. The axis 22 of the first key 12 underlies the second key 14 and the axis 24 of the second key 14 underlies the first key 12. This arrangement enables the keys to move vertically as much as possible and laterally as little as possible. The placement of the axes 26 and 28 of the first and second pivot pins 22 and 24 close to the face plate 16 also reduces lateral movement of the key face surfaces 32 and 38. However, if the first and second pivot pin axes 26 and 28 are spaced apart more than twice the width of each key face surface 32 and 38, the first and second pivot pins 22 and 24 will not cooperate with the apertures 42 and 44 to act as stops for the keys 12 and 14, and the first and second pivot pins 22 and 24 may also interfere with adjacent pairs of keys. If there is lateral space available, it would improve functioning of the first and second keys 12 and 14 to space the axes 26 and 28 apart more than twice the width of each key face surface 32 and 38.

A conventional, collapsible, resilient dome switch 46 (FIGS. 3 and 5) is mounted on a printed circuit board 48 below each key 12 and 14. The contact surfaces 50 and 52 on the body portions 30 and 36 of the first and second keys 12 and 14 contact an adjacent conventional, collapsible, resilient dome switch 46 to activate the switches when the first or second key 12 or 14 is depressed. As shown in FIG. 5, the second key 14 is depressed and the contact surface 52 has deformed one of the collapsible dome switches 46. The resilience of the switch can return the second key 14 to its starting position when pressure is removed from the key face surface 38 on the second key 14. Movement of the switch 46 toward the axis 28 will reduce the pressure required on the key face surface 32 to activate the switch 46. Movement of the switch 46 away from the axis 28 will increase the pressure required on the key face surface 32 to activate the switch 46. However, such movement of the switch 46 may also change the vertical distance the key face surface 32 moves. Springs can be provided to lift the first and second keys 12 and 14 if needed. The dome switches 46 are illustrative only; other kinds of conventional, depressible, resilient switches can be used.

The key face surfaces 32 and 38 on the side by side pairs of keys 12 and 14 slant or converge toward each other. As shown in FIG. 3, the key face surfaces 32 and 38 form an upwardly concave pocket for a finger. This pocket locates a finger and allows the operator to depress the first key 12 or the second key 14 by rolling the finger in the pocket toward one key or the other key. The operator can also depress the first key 12 or the second key 14 by moving a finger laterally toward the key to be depressed or by pressing down on the high portion of the key. When one key is depressed, as the second key 14 is in the position shown in FIG. 5, the key face surface 38 moves toward a position parallel to the face plate 16. The inclination of key faces is such that, when two keys are depressed simultaneously, the face surfaces are substantially co-planar.

The keyboard 10 as shown in FIG. 1 includes a plurality, such as twenty, sets of side by side keys 54 arranged in rows and columns and a plurality of single keys 56. As shown in FIG. 1 the keyboard 10 has a power switch 60 and a liquid crystal display 58 mounted on the mounting plate 20 and surrounded by the face plate 16. The mounting plate 20 is secured to the upper portion of side walls 62 one of which is shown in FIG. 2. The printed circuit board 48 is secured to the lower portion of side walls 62 in a position below and parallel to the face plate 16. Suitable connectors 64 are mounted on the side walls 62 to connect the keyboard 10 to a computer, a power source, or other desired equipment.

The columns of side by side keys 54 as shown in FIG. 1 are arranged so that the first or left hand keys 12 in each column of left hand keys correspond to the keys operated by the fingers of left hand on many typewriters and standard computer keyboards. The second or right hand keys 14 in each column of right hand keys of the side by side keys 54 correspond to the keys operated by the fingers of the right hand on many typewriters and standard computer keyboards. This arrangement of the keys is one of many that can be used and conforms to the so-called QWERTY keyboard. However, this arrangement of the keys allows operation by either the left or right hand and in either case, half the character locations are already known by most keyboard operators. If desired, the keys adapted to be operated by the right hand for a conventional keyboard can be colored or shaded, as shown in FIG. 1, differently from the keys adapted to be operated by the left hand. As shown in FIG. 1, the side by side keys 12 and 14 correspond in number to a complement of a corresponding number of keys contained in many typewriters and standard computer keyboards.

The vertical spacing between adjacent horizontal rows of side by side keys 54 is uniform. The horizontal spacing between adjacent vertical columns of left hand keys 12 is sufficient to accomodate one column of right hand keys 14 so that the columns of keys 12 alternate with the column of keys 14.

The side by side keys 12 and 14 have been shown in combination with conductive, collapsible, dome switches 46. The keys 12 and 14 could also be used in combination with mechanical switches, capacitive switches, or membrane switches. All four types of switches are commonly found in electronic keyboards for computers and computer terminals. The side by side keys 12 and 14 can easily be adapted to activate any one of the four types of switches as well as other switches.

The sets of side by side keys 54 have been described and shown in the drawing in one specific arrangement. The sets of side by side keys 54 can be placed or employed in many different arrangements without departing from the invention.

The disclosed embodiment is representative of the preferred form of the invention, but is intended to be illustrative rather than definitive thereof. The invention is defined in the claims.

What I claim is:

1. A compact keyboard comprising a plurality of individually movable keys arranged in a plurality of parallel, spaced apart rows and a plurality of parallel, spaced apart columns, all of said keys of said compact keyboard being operable by the fingers of one hand of a person, and the keys of said compact keyboard corresponding in number to a complement of a corresponding number of keys of a prior art keyboard having a first plurality of keys operable by the fingers of a persons's left hand and a second plurality of keys operable by the fingers of such person's right hand, each of said columns of keys having a left hand key and an adjacent right hand key, the left hand keys of each column of keys corresponding to those keys of the prior art keyboard operable by the fingers of the left hand of a person and the right hand keys of each column of keys of said compact keyboard corresponding to those keys of the prior art keyboard operable by the fingers of the right hand of a person.

2. A compact keyboard according to claim 1 wherein the prior art keyboard comprises a QWERTY keyboard.

3. A compact keyboard comprising a plurality of individually operable alphabetic and numeric keys of a conventional QWERTY keyboard and arranged in a plurality of rows and columns, the keys of said compact keyboard corresponding in number to a complement of a corresponding number of keys keys of said QWERTY keyboard operable by the fingers of a person's left hand and operable by the fingers of the person's right hand, the keys in each row of said compact keyboard corresponding to the keys of said QWERTY keyboard operable by the fingers of the person's left hand alternating with the keys in such row corresponding to the keys of said QWERTY keyboard operable by the fingers of such person's right hand.

4. A compact one-handed typing keyboard for use in lieu of a standard two-handed typing keyboard having a first plurality of keys arranged in columns and rows with a first predetermined sequence of characters and normally operable by one hand of a person and a second plurality of keys arranged in columns and rows with a second predetermined sequence of characters and normally operable by the other hand of said person, said compact one-handed keyboard comprising:

a) a first group of independently operable keys corresponding to the first plurality of keys of said standard keyboard and arranged in parallel, spaced apart columns and rows, adjacent columns being spaced apart greater than the spacing between adjacent rows; and b) a second group of independently operable keys corresponding to the second plurality of keys of said standard keyboard and arranged in parallel, spaced apart columns and rows, c) the rows of said first and second groups of keys being uniformly spaced apart, d) the keys of each column of the second group of keys being positioned in the space between adjacent columns of the first group of keys and alternating therewith.

5. A compact keyboard according to claim 4 having at least four columns of said first group of keys and four columns of said second set of keys.

6. A compact keyboard according to claim 5 having at least four rows of said first and second groups of keys.

7. A compact keyboard according to claim 4 wherein the keys of each of said groups of keys include numeric keys.

8. A compact keyboard according to claim 4 wherein the keys of each of said groups of keys include alphabetic keys.

9. A compact keyboard according to claim 4 wherein the keys of each of said groups of keys include numeric keys and alphabetic keys.

10. A compact keyboard according to claim 9 wherein said numeric and alphabetic keys correspond in number to the numeric keys and alphabetic keys of a prior art QWERTY keyboard.

11. The compact keyboard according to claim 4 wherein the spacing between keys in adjacent columns enables one finger of a person to bridge two keys of two adjacent columns of keys in a single one of said rows.

* * * * *